United States Patent Office 3,485,777
Patented Dec. 23, 1969

3,485,777
COMPATIBILIZATION OF POLYMERS BY
ADDING GRAFT COPOLYMERS
Norman G. Gaylord, New Providence, N.J., assignor to
U.S. Plywood-Champion Papers Inc., a corporation of
New York
No Drawing. Filed Mar. 28, 1966, Ser. No. 537,635
Int. Cl. C08f 29/20, 29/50
U.S. Cl. 260—17.4        22 Claims

ABSTRACT OF THE DISCLOSURE

There is disclosed the compatibilization of normally incompatible polymers, one of the polymers being a highly hydrogen bonded polyhydric polymer and the other polymer being a thermoplastic polymer. The solubility parameter of the thermoplastic polymer differs from the solubiliy parameter of the polyhydric polymer by at least about 1.0 unit. Compatibilization of these polymers is effected by mixing them with a graft copolymer. The graft copolymer contains segments having solubility parameters approximating the solubility parameter of the highly hydrogen bonded polyhydric polymer and other segments having solubility parameters approximating that of the thermoplastic polymer. Also disclosed are precompatibilized compositions which contain a highly hydrogen bonded polyhydric polymer and a graft copolymer of the type previously described. Such a precompatibilized composition is compatible with a thermoplastic polymer with which the polyhydric polymer is normally incompatible.

---

This invention relates to a process for compatibilizing at least two normally incompatible polymers and to composite systems obtained thereby. More particularly, this invention relates to the compatibilization of at least two normally incompatible polymers by the use of a third component which is a graft and/or block copolymer. This invention also relates to the precompatibilization of a highly hydrogen bonded polyhydric polymer with a graft copolymer.

The rapid growth of plastics in areas such as in packaging has markedly affected the traditional use of cellulose in these areas. The use of plastics has not only displaced many paper products but has opened up new areas of use. The major properties of plastics which render them useful in those areas formerly dominated by cellulose are their thermoplasticity and their ability to be formed and shaped such as by extrusion, molding, foaming and post-forming. Cellulose does not possess these properties unless it has been chemically modified to convert it into a plastic such as cellulose acetate.

Because cellulose, and other polyhydric polymers such as starch, are much less expensive then conventional thermoplastic materials and also because they possess certain desirable physical and chemical properties, it would be advantageous to be able to process them in the same manner as conventional thermoplastics. However, in previous attempts to prepare cellulose non-reactive thermoplastic composites by admixing cellulose and a thermoplastic polymer, the cellulose has appeared to virtually absorb the thermoplastic polymer. Final properties of such a mixture, particularly flow properties, are generally adversely affected.

It is an object of this invention to compatibilize a polyhydric polymer, such as cellulose, with a thermoplastic polymer.

It is another object of this invention to compatibilize a thermoplastic resin with a highly crystalline and/or highly hydrogen bonded polyhydric polymer.

It is a further object of this invention to provide a composite of a thermoplastic polymer and a polyhydric polymer which has improved flow and mechanical properties.

It is still another object of this invention to prepare a precompatibilized mixture of a highly hydrogen bonded polyhydric polymer and a graft copolymer, which mixture may thereafter be blended with a thermoplastic resin on conventional plastic processing equipment.

One embodiment of this invention, briefly, comprises compatibilizing at least two normally incompatible polymers, at least one of the polymers being a highly hydrogen bonded polyhydric polymer and at least one other of the polymers being a thermoplastic polymer having a solubility parameter different than that of the polyhydric polymer. This is accomplished by mixing the normally incompatible polymers with a graft copolymer. The graft copolymer contains at least two segments which have different solubility parameters, one of the segments being of a highly hydrogen bonded polyhydric polymer and the other segment having a solubility parameter in the region of the solubility parameter of the normally incompatible thermoplastic polymer which it is desired to compatibilize. The resultant composition is characterized by having improved flow and mechanical properties over a mixture of the normally incompatible polymers in the absence of said graft copolymer.

As used herein, the term "compatibilizing" is intended to include rendering the mixture of two or more polymeric materials permanently miscible so as to form a homogeneous composition which has useful plastic properties and which does not separate into its component parts. The term "graft copolymer" is intended to include block copolymers. Such copolymers possess segmental periodicity—i.e., they contain continuous sequences of one monomer that are not governed by statistical distribution.

The factors which govern the solubility and miscibility of polymers are discussed in detail in the literature; see, for example, Small, "Solubility of Polymers," J. Appl. Chem., vol. 3, February 1963, pages 71 to 80. This article explains the basis for ascertaining the numerical solubility parameter of a polymer from its structural formula and its density. Further details for determining the solubility parameters of polymeric materials and the actual solubility parameter values of a number of polymers are discussed in the literature including H. Burrell, Federation of Paint and Varnish Production Clubs, Official Digest, vol. 27, No. 369, pages 726 to 758 (1955) and vol. 29, No. 394, pages 1069 to 1076; W. Moore, Society of Dyers and Colourists Journal, vol. 73, pages 500 to 506; and J. Gardon, Journal of Paint Technology, vol. 38, No. 492, January 1966. The disclosures of each of these cited references is incorporated herein by reference.

The solubility parameter of a polymer is a constant which is a characteristic for each polymer. Solubility parameter values for polymers are generally given as a narrow range or as a single number which represents the midpoint of the range. The solubility parameters for several polymeric materials are given below:

| Polymer: | Solubility parameter, midpoint of range |
|---|---|
| Cellulose dinitrate | 10.6 |
| Cellulose nitrate, ½ sec. | 11.5 |
| Cellulose diacetate | 10.9 |
| Ethyl cellulose | 10.3 |
| Epon 1004 | 10.9 |
| Nylon 66 | 13.6 |
| Nylon type 8 (methoxy methylated nylon 66) | 12.7 |

| Polymer: | Solubility parameter, midpoint of range |
|---|---|
| Polyacrylonitrile | 15.4 |
| Polyethylene | 7.9 |
| Poly(ethylene terephthalate) | 10.7 |
| Polymethacrylonitrile | 10.7 |
| Poly(methyl α-chloroacrylate) | 10.1 |
| Poly(methyl methacrylate) | 9.5 |
| Poly(ethyl methacrylate) | 9.1 |
| Poly(n-propyl methacrylate) | 8.8 |
| Poly(n-butyl methacrylate) | 8.3 |
| Poly(t-butyl methacrylate) | 8.7 |
| Poly(n-hexyl methacrylate) | 8.6 |
| Poly(lauryl methacrylate) | 8.2 |
| Poly(i-bornyl methacrylate) | 8.2 |
| Poly(stearyl methacrylate) | 8.2 |
| Poly(ethoxyethyl methacrylate) | 9.0 |
| Poly(methyl acrylate) | 10.1 |
| Poly(ethyl acrylate) | 9.2 |
| Poly(propyl acrylate) | 9.0 |
| Poly(n-butyl acrylate) | 8.7 |
| Poly(methyl α-cyanoacrylate) | 14.0 |
| Polyvinyl acetate | 9.4 |
| Polyvinyl bromide | 9.6 |
| Polyvinyl chloride | 9.7 |
| Polyvinylidene chloride | 12.2 |
| Vinyl chloride-vinyl acetate copolymer | 10.4 |
| Polychlorotrifluoroethylene | 7.2 |
| Polystyrene | 9.1 |
| Buna N rubber | 9.4 |
| Chlorinated rubber | 9.4 |
| GRS rubber | 8.1 |
| Natural rubber | 8.3 |
| Neoprene GN | 9.2 |
| Polyisoprene | 8.1 |
| Polybutadiene | 8.6 |
| Polyisobutylene | 8.1 |
| Polysulfide rubber | 9.4 |
| Polyurethane | 10.0 |
| Poly(phenyl methyl silicone) | 9.0 |
| Poly(dimethyl silicone) | 7.3 |
| Polytetrafluoroethylene | 6.2 |
| Ethylene-propylene copolymer | 7.9 |
| Propylene oxide-butadiene monoxide copolymer | 9.1 |
| Vinyl acetate-acrylonitrile copolymer | 10.5 |

A knowledge of the solubility parameters of two different polymeric materials permits one to determine the miscibility or compatibility of those materials. Thus, if the values of the solubility parameters of two polymers are nearly equal, the substances are miscible. As a general rule, if the midpoint of the ranges of the solubility parameters of two different polymers differ by more than about 1.0 unit, the polymers will be incompatible.

According to the practice of this invention, at least two normally incompatible polymers, one of which is a highly hydrogen bonded polyhydric polymer, are rendered compatible by mixing them together in the presence of a graft copolymer which is selected by reference to the solubility parameters of the segments of which it is composed. One segment of the graft copolymer is of a highly hydrogen bonded polyhydric polymer which will have a solubility parameter in the region of the solubility parameter of the highly hydrogen bonded polyhydric polymer to be compatibilized; and another segment must have a solubility parameter in the region of the solubility parameter of the thermoplastic polymer which is to be compatibilized. It is preferred that each of the segments of the graft copolymer have solubility parameters which do not differ from the solubility parameters of the polymer in the same region by more than 1.0 units.

The solubility parameter of each segment of the graft copolymer is approximately the same as the solubility parameter of a homopolymer of that segment. However, in the practice of this invention, the compatibilization is not limited to polymers chemically similar to the segments of the graft copolymer but extends to polymers having solubility parameters approximately equal to the solubility parameter of each segment.

The polyhydric polymer having a high degree of hydrogen bonding which may be used in the practice of this invention may be, for example, a polysaccharide, such as cellulose, starch, dextrin, etc., or a polyvinyl alcohol or mixtures thereof. When cellulose is used as the polyhydric polymer, it may be derived by known techniques from wood pulp, cotton, cotton linters, regenerated cellulose (viscose rayon), etc. Polyvinyl alcohol which may be used as the polyhydric polymer includes commercially available grades of polyvinyl alcohol which are obtained by the substantially complete hydrolysis of polyvinyl acetate. It is to be understood that some unhydrolyzed acetate groups may be contained on the polyvinyl alcohol. Highly hydrogen bonded derivatives of the polyhydric polymer may also be employed.

The solubility parameters of such polyhydric polymers cannot be calculated with certainty because of their high degree of hydrogen bonding. However, it is known that they have solubility parameters above about 12 and, generally, above about 15.

An example of a cellulose which may be used in the practice of this invention is a bleached sulfite wood cellulose which has the following typical analysis—

Cellulose (based on direct determination of solubility in 10% NaOH ($S_{10}$) and 18% NaOH ($S_{18}$) solutions similar to TAPPI standard T 235 m.):

| | |
|---|---|
| $R_{10}$ | percent__ 72.9 |
| $S_{10}-S_{18}$ | do____ 11.8 |
| $S_{18}$ | do____ 15.3 |
| 10% KOH solubility | do____ 30.2 |
| Ash | do____ 0.13 |
| Calcium | do____ 0.04 |
| Ether extract | do____ 0.26 |
| G. E. brightness | 91.6 |
| Cuene intrinsic viscosity | 3.8 |

Another example of a cellulose which may be used is a wood flour which has a brightness of about 80, and an approximate average particle size of 50 microns in length and 20 microns in thickness.

Another example of a cellulose which may be used is a bleached mixed hardwood pulp of paper making grade having a brightness of 82 or higher.

The thermoplastic polymers which may be used in the practice of this invention are well known in the art and several examples have been set forth above along with their solubility parameters. Examples of such polymeric materials which may be used include acrylic resins (e.g., homopolymers and copolymers with each other or with other monomers of methyl acrylate, methyl methacrylate, ethyl acrylate, ethyl methacrylate, butyl acrylate, butyl methacrylate, acrylic acid and methacrylic acid); polyolefins (e.g., polyethylene, polypropylene and ethylene-propylene copolymers); nylon; polycarbonates; polystyrene; copolymers of styrene and other vinyl monomers such as acrylonitrile; vinyl polymers such as homopolymers and copolymers of vinyl acetate; vinyl chloride and vinyl butyral; homopolymers and copolymers of dienes such as polybutadiene, polyisoprene, butadiene-styrene copolymers, butadiene-acrylonitrile copolymers and acrylonitrile-butadiene-styrene copolymers and other unvulcanized elastomers. Condensation polymers may also be used such as polyester and alkyd resins which are obtained by the condensation of a polyhydric alcohol and a polycarboxylic acid. Examples of polycarboxylic acids which may be used to form the polyester resin include phthalic acid, phthalic anhydride, succinic acid, adipic acid, maleic acid, itaconic acid, isophthalic acid, terephthalic acid, etc. The polyhydric alcohols which may be used in the preparation of the polyester or alkyd resin may include the glycols, such as ethylene glycol, propylene glycol, etc. Thermoplastic epoxy resins may be used. Epoxy resins include the condensation products of bis-phenol and epichlorohydrin, epoxylated drying oils, the glycidol ethers of glycerol, epoxylated novolac resins, etc. The thermoplastic resin may be a resin which is capable of being thermoset or cured but which is used at temperatures and conditions which will not thermoset or cure the resin. Such resins include phenol-formaldehyde condensates, urea or melamine-formaldehyde condensates, casein, gelatin, etc.

The graft copolymers which are used in the practice of this invention may be prepared by techniques known in the art. Any of the ethylenically unsaturated monomers set forth above may be grafted onto one of the polyhydric polymers described above by addition polymerization techniques, In preparing the graft copolymer, one of the preferred techniques to initiate branching on the polyhydric polymer is by means of ceric ion redox reaction since this results in minimal concurrent formation of homopolymers. With this system, free radicals are formed directly on the polyhydric polymer substrate as a consequence of an oxidation-reduction reaction between ceric ions and carbinol groups. This raction may be illustrated as follows:

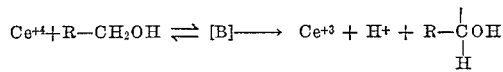

or

wherein R—CH$_2$OH represents a polyhydric polymer. B, an addition complex of the starting materials, can decompose with electron transfer to yield free radicals at or adjacent to the hydroxyl sites. Evidence for such complex formation is also shown by the highly colored solutions resulting from solution of ceric salts in anhydrous alcohols. Once these free radicals are formed on the polyhydric polymer, grafting will occur in the presence of the monomer.

Further details of ceric ion initiated graft copolymerization are described in the prior art such as G. Mino and S. Kaizerman, J. Polymer Sci., 31 242 (1958); G. Mino et al., J. Polymer Sci., 38 393 (1959); G. Mino et al., J. Polymer Sci., 39 523 (1959); G. N. Richards, J. Applied Polymer Sci., 5, 535 (1961); H. Sumitomo and Y. Hachihama, Kogyo Kagaku Zasshi, 66, 1508–11 (1963); and in U.S. Patent No. 2,955,015, the disclosures of each of which are incorporated herein by references. These references disclose, for example, the grafting of acrylamide, methyl acrylate and acrylonitrile on polyvinyl alcohol; the grafting of acrylonitrile on cotton; the grafting of styrene on cellulose; and the grafting of acrylic esters on pure cellulose and cellulose in the form of paper.

The graft copolymer may also contain a segment derived by condensation or rinfi-opening polymerization—e.g., by treatment of a highly hydrogen bonded polyhydric polymer with caprolactam to yield a polyhydric polymer-polyamide graft copolymer.

The following experiments illustrate the preparation of graft copolymers which may be used in the practice of this invention.

EXPERIMENTS 1–10

In each of these experiments, a monomer of the type and in the amount indicated in Table 1 is copolymerized with cellulose. In Experiments 1 to 3, a bleached sulfite wood cellulose having an analysis as described previously is employed; in Experiments 4 and 6 to 10, the cellulose used is in the form of rayon flock which is chopped regenerated cellulose fibers; and in Experiment 5, a wood flour having properties as previously described is used. In this table, the monomers are abbreviated as follows:

ethyl acrylate=EA
methyl methacrylate=MM.

In the Experiments 1 to 3, the bleached sulfite wood cellulose is first converted into a finely divided suspension in distilled water. In the experiments which utilize ethyl acrylate, the ethyl acrylate is added in the form of an emulsion prepared by emulsifying 100 ml. of ethyl acrylate in 1800 ml. of water containing 1.14 g. of Arquad 18 (a cationic quaternary ammonium salt containing alkyl groups in the following average amounts: octyl, 8%; decyl, 9%; dodecyl, 47%; tetradecyl, 18%; hexadecyl, 8%; octadecyl, 5%; octadecenyl, 5%; octadecadienyl, 5%).

The ceric ammonium nitrate solution, which is used as the catalyst in the amount specified in Table I is prepared by mixing 129.8 ml. of concentrated HNO$_3$, diluted with water to a 2-liter solution, and 105.66 g. of

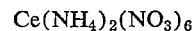

In these experiments, Arquad 18 in the amount specified in Table I is added to the reaction system.

In each experiment, the reaction system is thoroughly flushed free of air prior to addition of the ceric solution and all reactions are performed under a continuous flow of nitrogen or, when carried out in an autoclave, under an atmosphere of the monomer.

In Experiment 1, 0.7072 g. of pretreated cellulose and 240 ml. of the ethyl acrylate emulsion are added to a flask and thoroughly dispersed. The ceric solution is then added to start the reaction. The reaction mixture changes from an orange to yellowish green color during 90 minutes of reaction at room temperature. The insoluble reaction product is filtered, washed with distilled water and extracted with methanol. After drying a yield of 6.8256 g. of reaction product is obtained. This represents an 865% increase in weight over the cellulosic starting material. The product is then further extracted with methyl ethyl ketone which reduces the weight only very slightly, to 6.8210 g.

In Experiment 3, the procedure is identical to that of Experiment 1 except that a reaction temperature of 60° C. is employed.

In performing Experiments 2 and 5 to 10, 14.5 g. of distilled water are charged to a reaction container along with the cellulose, monomers and Arquad 18. This reaction is stirred over night under a slow flow of nitrogen to effect emulsification of monomer, dispersion of the cellulose, and displacement of air with nitrogen. Reaction is then initiated by addition of the ceric solution. In order to obtain maximum yield, reaction is continued over night. The reaction product is then poured into a tub and washed thoroughly with demineralized water. This washing process is done in a continuous manner with constant flow of water until the product is free of suds. The absence of suds or foam upon shaking the wash water in a test tube is a good indication of complete removal of the emulsifying agent and catalyst components from the reaction product. After filtration and rinsing with methanol, the grafted product is extracted with methanol and with acetone. The completion of extraction is determined by addition of an aliquot of extract to water; the absence of a precipitate indicates completion of the process. After decantation of acetone the product is heated with methanol in order to facilitate drying of the product.

The weight of the graft copolymer obtained in each experiment and the percent increase in weight of the product over the weight of the unreacted cellulose are set forth in Table I.

TABLE I.—PREPARATION OF GRAFT COPLOYMERS

| Experiment | Cellulose Type | Quantity, g. | Monomer Type | Quantity, ml. | Ceric Solution, ml. | Arquad 18, g. | Graft copolymer Weight, g. | Weight Increase, Percent |
|---|---|---|---|---|---|---|---|---|
| 1 | Bleached sulfite wood cellulose. | 0.7072 | EA | 12.6 | 12.6 | 0.14 | 6.8210 | 859 |
| 2 | do | 37.3 | EA | 666.6 | 666.6 | 7.6 | 240 | 543 |
| 3 | do | 1.0694 | EA | 19.1 | 19.1 |  | 3.8 | 255 |
| 4 | Rayon flock | 37.3 | EA | 666.6 | 666.6 | 7.6 | 260.3 | 598 |
| 5 | Wood flour | 45.1 | EA | 805.5 | 805.6 | 9.2 | 275.5 | 511 |
| 6 | Rayon flock | 45.1 | MM | 805.5 | 805.6 | 9.2 | 335.0 | 643 |
| 7 | do | 180.4 | EA | 805.5 | 805.6 | 9.2 | 590 | 227 |
| 8 | do | 180.4 | MM | 805.5 | 805.6 | 9.2 | 508 | 182 |
| 9 | do | 180.4 | MM | 805.5 | 402.8 | 9.2 | 384 | 111 |
| 10 | do | 180.4 | MM | 402.5 | 805.6 | 9.2 | 314 | 74 |

EXPERIMENT 11

An ethyl acrylate-cellulose graft copolymer as described in Experiment 7 is prepared from the following materials:
(a) 14,500 ml. of distilled water
(b) 9.2 g. of Arquad 18–50
(c) 805.5 ml. of ethyl acrylate monomer
(d) 180.4 g. of rayon flock
(e) 805.6 ml. of ceric solution
$(0.1 \text{ M Ce(NH}_4)_2(\text{NO}_3)_6 \cdot 1 \text{ M NHO}_3)$

*Procedure.*—An emulsion of (a), (b), (c) and (d) is stirred and purged with a slow stream of nitrogen overnight at room temperature in a 17 liter reaction container equipped with a stirrer, thermometer and gassing tube, then (e) is added to initiate the reaction which is continued under slow $N_2$ purge overnight at room temperature. After concentration by decantation, the product is washed thoroughly with copious amounts of demineralized water, filtered, rinsed in methanol, extracted with methanol, then extracted with acetone, solvent exchanged with methanol and dried to constant weight. The product is then comminuted with Dry Ice and dried in a vacuum oven at room temperature to constant weight. The weight increase is 227%, corresponding to a product consisting of 69.5% polyethyl acrylate and 30.5% cellulose.

EXPERIMENT 12

An ethyl acrylate-starch graft copolymer is prepared from the following materials:
(a) 2,750 ml. of distilled water
(b) 100 g. of Superlose 95% amylose starch
(c) 1.71 g. of Arquad 18–50 (average molecular weight of about 150,000)
(d) 150.0 ml. of ethyl acrylate monomer
(e) 111.5 ml. of ceric solution $(0.1 \text{ M Ce(NH}_4)_2(\text{NO}_3)_6$ 1 M $HNO_3$)

*Procedure.*—A highly swollen slurry of the Superlose Starch (b) is prepared by dispersing the starch (b) in cold water (0–15° C), then heating to higher than 80° C. followed by cooling. To this swollen slurry is added (c) and (d) and (a), (b), (c) and (d) are emulsified by stirring. This emulsion is stirred and purged with nitrogen for 15 minutes at room temperature in a resin kettle, with a 4 neck head equipped with stirrer, condenser, gas dip tube and thermometer. The dip tube is replaced with a gas inlet through which a slow stream of nitrogen is maintained and (e) is added to initiate the reaction which is continued under a slow $N_2$ purge for 6.5 hours. The product is filtered and washed very thoroughly with distilled water, then washed with methanol and dried to constant weight. A white granular product is obtained. Extraction of an aliquot showed the graft to comprise 46.5% poly (ethyl acrylate) and 53.5% starch.

EXPERIMENT 13

An ethyl acrylate-polyvinyl alcohol graft copolymer is prepared from the following materials:
(a) 2,750 ml. of distilled water
(b) 100.0 g. of polyvinyl alcohol (140–155 cps.; 98.5–100% hydrolysis)
(c) 1.71 g. of Arquad 18–50
(d) 150.0 ml. of ethyl acrylate monomer
(e) 111.5 ml. of ceric solution $(0.1 \text{ M Ce(NH}_4)_2(\text{NO}_3)_6$ 1 M $HNO_3$)

*Procedure.*—A soluiton of the polyvinyl alcohol (b) is prepared by dispersing (b) in cold water (0–15° C.) heating to 80° C., and then cooling. Then, (c) and (d) are added to this solution and the mixture is emulsified by stirring. The emulsion is stirred and purged with nitrogen for 10 minutes at room temperature in a 5 liter resin kettle with a 4 neck head equipped with a stirrer, condenser, gas dip tube and thermometer. The dip tube is replaced with a gas inlet through which a slow stream of nitrogen is maintained and (e) is added to initiate the reaction which is continued with stirring under a slow stream of nitrogen for 3 hours. The product is a blue-white emulsion with only slight settling. The graft is recovered by flash evaporation to films in a flash evaporator. The films are ground in Dry Ice and dried to constant weight. Analysis of an aliquot showed the copolymer to be 52% ethyl acrylate and 48% polyvinyl alcohol.

In preparing the composite of this invention, sufficient graft copolymer should be used to compatibilize the mixture of the thermoplastic polymer and the polyhydric polymer. It is preferred to use from about 5 to 95% by weight of the thermoplastic polymer, from about 95 to 5% by weight of the polyhydric polymer and from about 0.5 to 50% by weight of the graft copolymer.

The compatibilized mixture of the thermoplastic resin, the polyhydric polymer and the graft copolymer may be formed by mixing the components under conditions of high shear forces such as on a roll mill, a ball mill or other blending mills. Alternatively, the compatibilized mixture may be prepared by blending the components in the presence of a solvent which is known to decrease hydrogen bonding in the polyhydric polymer, followed by removal of the solvent by conventional techniques. Some examples of solvents which decrease hydrogen bonding in the polyhydric polymer include aqueous calcium thiocyanate, aqueous zinc chloride, aqueous sodium hydroxide, pyridine, dimethyl sulfoxide, ethylene diamine and N,N-dimethyl formamide. Some of these solvents must be used in certain minimum proportions to accomplish decrease in hydrogen bonding.

According to another embodiment of this invention, a precompatibilized blend of the highly hydrogen bonded polyhydric polymer and the graft copolymer may be prepared. This may be accomplished by blending the polyhydric polymer and the graft copolymer in the presence of a solvent which is known to decrease hydrogen bonding in the polyhydric polymer, followed by removal of the solvent by conventional techniques and drying. Alternatively, the precompatibilized mixture may be prepared by ball milling the polyhydric polymer with the graft copolymer in the absence of a solvent. The precompatibalized mixture, by whatever method it is prepared, may then either immediately after preparation or at a subsequent time, be blended with the thermoplastic resin on conventional plastic processing equipment.

By the practice of this invention, for example, a cellulose graft copolymer containing segments of a thermoplastic polymer may be used as a compatibilizing agent to permit the formation of a homogeneous mixture of unmodified cellulose and the thermoplastic polymer—e.g., a cellulose styrene graft copolymer may be used to compatibilize cellulose and polystyrene; a cellulose-vinyl chloride graft copolymer may be used to compatibilize cellulose and polyvinyl chloride; a cellulose-ethylene graft copolymer may be used to campatibilize cellulose and polyethylene; etc. Also, a graft copolymer containing polyhydric polymer segments and thermoplastic polymer segments may be used as a compatibilizing agent for a different polyhydric polymer and/or a different thermoplastic polymer—e.g., a cellulose-ethyl acrylate graft copolymer may be used to compatibilize cellulose and poly (mehyl methacrylate) or it may be used to compatibilize starch and polyvinyl chloride due to the similarity of the solubility parameters of the segments of the graft copolymers with the homopolymers being compatibilized.

This invention achieves for the first time compatibilization of a thermoplastic material with highly crystalline, highly hydrogen bonded polmers such as purified native cellulose, starch and polyvinyl alcohol. Moreover, plastics which cannot be readily extruded due to their high melt viscosities and/or their tendency to decompose at the elevated temperatures needed to attain flow, such as rigid polyvinyl chloride, may be rendered more easily processable. The compatibilized mixture may be extruded or molded as a true thermoplastic.

The compatibilized mixtures of polymers of this invention exhibit improved flow and decreased melt viscosities over that of an identical mixture omitting the graft copolymer. The composites of this invention may also have improved impact resistance and other mechanical properties.

Some of the compositions of this invention which include cellulose compatibilized with a thermoplastic polymer may be used to form translucent or transparent products such as bottles, thus permitting the use of cellulose in areas where plastics now predominate.

Compatibilized mixtures of this invention may be fabricated into webs (paper) which exhibit improved wet and dry strength, printability, gloss, flexibility, dimensional stability, water resistance and other desirable paper properties. Moreover, the compositions may be formed into sheets or films or used as an intermediate layer to bond a layer of resin to a layer of nonwoven material such as paper.

A web of a highly hydrogen bonded polyhydric polymer, such as a paper or fabric sheet, may be made according to the practice of this invention by preparing a precompatibilized mixture of conventional paper making or textile cellulose fibers and a graft copolymer containing segments having solubility parameters as previously described. The precompatibilized mixture may be formed into a web of paper or fabric by conventional techniques or it may be formed into a multi-layered paper in which the bottom layer is conventional paper and the top layer is of the precompatibilized mixture. When the resultant web is laminated with a layer of a thermoplastic polymer having a solubility parameter in the region of the solubility parameter of one of the segments of the graft copolymer, a structure is obtained which is highly resistant to de-laminating. Moreover, such a web may be printed, sized or coated with a composition which includes a component having a solubility parameter in the region of the solubility parameter of one of the segments of the graft copolymer, thus resulting in improved cohesiveness between the ink, size or coating and the web.

The following examples illustrate the best modes contemplated for carrying out this invention. In the examples, all parts are by weight unless otherwise stated.

Example 1

The following materials are thoroughly mixed on a Brabender Plasticorder mixing head operated at a temperature of 165° C. and a shear of 63 r.p.m.:

| Material: | Amount, parts |
|---|---|
| Poly(methyl methacrylate) | 18.5 |
| Copolymer containing 95% by weight of ethyl acrylate and 5% by weight of vinylchloroacetate | 18.5 |
| Rayon flock | 9.3 |
| Graft copolymer obtained in Experiment 4 | 3.7 |

The poly(methyl methacrylate) is preheated at a temperature of 110° C. for 1 hour and added to the mixer. There are then added the remaining materials in the order listed above. The torque used in mixing the composition at 20 minutes is 2670±35 meter-grams and the stock temperature at 20 minutes is 169° C. After mixing, the compatibilized product is light tan, has a pleasantly soft hand, is very tough and may be readily molded. When the material is molded, it resembles a floor tile composition. The molded product is lighter in color, has fewer and smaller bubbles, is more flexible and more homogeneous in appearance than an article molded from a composition prepared as described above except omitting the graft copolymer.

Example 2

A blend of polyvinyl chloride and cellulose using an ethyl acrylate-cellulose graft copolymer as the compatibilizing agent is prepared from the following materials:

(a) 112 parts of compounded polyvinyl chloride containing 100 parts of polyvinyl chloride having an inherent viscosity of 0.675; 2 parts of an organotin mercaptide stabilizer (Thermolite 35) and 10 parts of dibutyl phthalate plasticizer
(b) 50 parts of bleached cotton linters
(c) 20 parts ethyl acrylate/rayon flock graft copolymer as prepared in Experiment 11
(d) dimethyl sulfoxide

*Procedure.*—A 15% solids preswollen slurry of component (a) in dimethyl sulfoxide is prepared. Also, 5% solids preswollen particle slurries of (b) and (c), respectively, are similarly prepared in dimethyl sulfoxide. Slurry (c) is comminuted thoroughly in a Waring Blendor. Slurry (b) is added, mixed and pulped thoroughly to give blend (bc). This is stirred while heating to 90–105° C. Simultaneously, slurry (a) is stirred and heated to 80–95° C. after which slurry (a) is blended into blend (bc). After cooling, this homogeneous viscous blend (abc) is precipitated in distilled water, washed thoroughly in distilled water by decantation, collected on a funnel and dried at 60° C. to constant weight. The material balance is excellent, recovery being 97.8% of the solids charged.

In order to determine the flow properties of the composite prepared in this example, a 3.0 g. sample is pressed between press polished parallel plates at 340° F. for 1 minute at 30,000 lbs. constant ram pressure, then transferred to a cold press and cooled under 30,000 lbs. constant ram pressure. The resulting disc is accurately weighed and its area measured. Dividing the area by the weight, the flow is calculated as cm.²/g. Alternately, a standard area may be cut from the center of the disc and by dividing by its weight the flow may be calculated. The two methods show excellent agreement. The flow of the cellulose-graft-thermoplastic composition is 27.9 cm.²/gm.

For the purpose of comparison, Example 2 is repeated omitting the graft copolymer. Therefore, the composition thus prepared serves as a control. The flow properties of this control composition are determined as described above and determined to be 23.6 cm.²/gm. Therefore, the composition which contains the graft copolymer exhibits an 18.1% improvement in flow over the control containing no graft copolymer thus indicating that the graft copolymer has compatibilized the polyvinyl chloride and cellulose.

Examples 3–10

Using the same procedure described in Example 2, the thermoplastic polymers, polyhydric polymers and graft copolymers set forth in Table II are blended in the respective amounts of 100 parts (thermoplastic polymer), 50 parts (polyhydric polymer) and 20 parts (graft copolymer). The graft copolymer used in each example is composed of one segment having a solubility parameter in the region of the solubility parameter of the thermoplastic polymer and of another segment consisting of a polyhydric polymer which may be the same or different from that of the polyhydric polymer which it is intended to compatibilize. The examples which employ polyvinyl chloride as the thermoplastic polymer use the polyvinyl chloride described in Example 2 in combination with 2 parts of the stabilizer and 10 parts of the plasticizer described in Example 2. In Example 3, N,N-dimethyl formamide is substituted for the dimethyl sulfoxide as the mixing solvent. In each example, the flow properties of the composite composition are determined by the procedure described in Example 2, the results being set forth in Table II. The flow improvement of each of the examples as compared to a control composition which is identical with the composition of the example except that it contains no graft copolymer is also calculated and the results are set forth in Table II. The control used for Examples 3 and 4 is the same as the control used in Example 2. The controls for Examples 5 to 10 are described in Table II. In each example, the use of the graft copolymer compatibilizing agent results in a marked improvement in the flow of the composite.

of this period, the slurries contained in both vessels are quite viscous and both the cellulose and the graft copolymer appear to be quite swollen by the pyridine. The contents of the vessel containing the graft copolymer and pyridine are then placed in a high speed comminuting blender and blended for 15 seconds resulting in the very fine comminution of the graft copolymer. The pyridine swollen mixed hardwood pulp is then slowly added to the graft copolymer with mixing. After all of the cellulose has been added, the mixture is blended for a period of twenty minutes. At the end of this period, the mixture is very homogeneous and contains no discrete particles of of graft copolymer. The slurry of the cellulose-graft copolymer blend is then added with vigorous agitation to 300 parts of distilled water in a comminuting blender. This results in re-hydrogen bonding of the cellulose-graft copolymer blend and the resultant precipitation of the blend. The precipitate is collected by filtration and washed four times by re-slurrying for 30 minutes with stirring in distilled water. After each washing, the cellulose-graft copolymer blend is recovered by filtration and the filtrate is discarded. After the last two washings, the filtrates are clear. The cellulose-graft copolymer blend is then dried overnight at 60° C. to constant weight. The yield of precompatibilized cellulose obtained corresponds to 96.5% of theory.

Example 12

The process of the preceding example is repeated substituting dimethylformamide for the pyridine used in that example. A precompatibilized mixture of cellulose and graft copolymer is obtained in a yield of 98.5% of theory.

| Example | Thermoplastic polymer | Graft copolymer | Polyhydric polymer | Flow, cm.²/g. | Flow improvement (percent better than control) |
|---|---|---|---|---|---|
| 3 | Polyvinyl chloride | Ethyl acrylate/rayon flock as prepared in Experiment 11. | Bleached cotton linters | 29.8 | 26.1 |
| 4 | do | Ethyl acrylate/polyvinyl alcohol as prepared in Experiment 13. | do | 26.5 | 12.1 |
| Control for Examples 5 and 6. | do | None | Bleached sulfite wood cellulose | 23.6 | |
| 5 | do | Ethyl acrylate/polyvinyl alcohol as prepared in Experiment 13. | do | 27.2 | 15.0 |
| 6 | do | Ethyl acrylate/starch as prepared in Experiment 12. | do | 29.4 | 24.2 |
| Control for Example 7. | Poly(methyl methacrylate). | None | do | 22.8 | |
| 7 | do | Ethyl acrylate/rayon flock as prepared in Experiment 11. | do | 30.5 | 33.0 |
| Control for Example 8. | Polyvinyl chloride | None | Bleached mixed hard-wood pulp (of paper making grade). | 23.2 | |
| 8 | do | Ethyl acrylate/rayon flock prepared as described in Experiment 11. | do | 29.8 | 28.1 |
| Control for Example 9. | do | None | Bleached pine pulp (of paper making grade). | 23.5 | |
| 9 | do | Ethyl acrylate/rayon flock prepared as described in Experiment 11. | do | 29.5 | 25.5 |
| Control for Example 10. | do | None | 95% Amylose starch 150,000 average molecular weight). | 21.4 | |
| 10 | do | Ethyl acrylate/rayon flock prepared as described in Experiment 11. | do | 24.8 | 17.0 |

The Izod impact strengths of the composition prepared in Examples 2, 4 and 8 are determined to be, respectively, 1.05, 0.90 and 0.72. By way of contrast, the Izod impact strength of the control for Example 8 is determined to be 0.56.

Example 11

Bleached mixed hardwood pulp of papermaking grade which has been repulped by grinding in admixture with Dry Ice (19.65 parts of pulp) and pyridine (353.4 parts) are charged to a vessel. Into another vessel there are placed ethyl acrylate-rayon flock graft copolymer obtained in Experiment 11 (7.86 parts) and pyridine (157.2 parts). The mixture in each vessel contains 5% by weight of solids and the weight ratio of pyridine to solids is 19:1. The ratio of the cellulose to the graft copolymer is 5:2. Both vessels are agitated for 44 hours. At the end

Example 13

The process of Example 11 is repeated substituting dimethyl sulfoxide for the pyridine. The precompatibilized cellulose-graft copolymer mixture is obtained in a yield of 97.5% of theory.

Example 14

The process of Example 11 is repeated substituting a 5% sodium hydroxide solution for the pyridine. The precompatibilized cellulose-graft copolymer mixture is obtained in a yield of 89.5% theory.

Example 15

A mixture of repulped mixed hardwood of the type described in Example 11 (19.65 g.) and ethyl acrylate-rayon flock graft copolymer as obtained in Experiment 11 (7.86 parts) is placed in a comminuting blender. There is then slowly added dimethyl sulfoxide (247.6 parts) and the mixture is thoroughly blended. After blending for 20 minutes, there is obtained a very smooth, homogeneous paste containing no apparent discrete graft copolymer particles. The precompatibilized cellulose-graft copolymer mixture is then precipitated from the slurry as described in Example 11 in a yield corresponding to 98.5% theory.

Example 16

In a ball mill jar containing porcelain balls, there are placed mixed hardwood pulp of the type described in Example 11 (11.0 parts) and ethyl acrylate-rayon flock graft copolymer obtained in Experiment 11 (4.4 parts). The mixture is milled for 168 hours. After milling, a fine homogeneous powder (89.5% of theory) is obtained.

Examples 17–22

The precompatibilized mixtures obtained in Examples 11–16 are blended with polyvinyl chloride in amounts of 33.85 parts of precompatibilized cellulose-graft copolymer mixture and 21.15 parts of compounded polyvinyl chloride. The compounded polyvinyl chloride is previously prepared by adding 10.0 parts of an organotin mercaptide stabilizer (Thermolite 35), 125 parts of benzene and 50.0 parts of dibutyl phthalate to 500 parts of polyvinyl chloride resin, thoroughly blending the mixture and subsequently drying. The compounded polyvinyl chloride and the precompatibilized cellulose-graft copolymer mixtures in each example are mixed on a Brabender Plasticorder mixing head operated at a temperature of 157 to 160° C. and a shear of 20 r.p.m. for 12 minutes. The amount of the final blend obtained in each example is recorded in Table III. In each of the examples, the ratio of cellulose: graft copolymer: polyvinyl chloride in the blend is 2.5:1:5.6. The ratio of precompatibilized mixture to polyvinyl chloride is 1:1.6.

In order to determine the flow properties of the composite prepared in each example, a 3.0 g. sample is pressed between polished parallel plates at 340° F. for 2 minutes under 31,000 p.s.i. gage. The flow in square centimeters per gram is calculated for each example and is set forth in Table III.

By way of comparison, a control composition is prepared as described above except that the graft copolymer is omitted. The ratio of cellulose to polyvinyl chloride blend in the control is 2.5:5.6—i.e., the same ratio of cellulose to polyvinyl chloride as employed in Examples 17 to 22. This control is prepared by mixing 38.02 parts of compounded polyvinyl chloride composition and 16.98 parts of cellulose. The flow of this composition is determined as described above and is reported in Table III. The flow of this control is assigned the arbitrary value of 1.00 and the relative flow of Examples 17–22 is calculated by comparison to the control. The relative flows of Examples 17 to 22 are set forth in Table III.

TABLE III

| Example | Precompatibilized mixture of Example | Yield of blend, g. | Flow, cm.²/g. | Relative flow |
|---|---|---|---|---|
| 17 | 11 | 54.8 | 40.89 | 1.38 |
| 18 | 12 | 54.8 | 37.51 | 1.28 |
| 19 | 13 | 54.7 | 38.08 | 1.20 |
| 20 | 14 | 53.9 | 38.45 | 1.36 |
| 21 | 15 | 54.3 | 37.58 | 1.24 |
| 22 | 16 | 55.0 | 42.72 | 1.40 |
| Control | | 54.6 | 29.70 | 1.06 |

Examples 23 and 24

In Example 23, cellulose (mixed hardwood pulp of the type described in Example 11) is precompatibilized with an ethyl acrylate-rayon flock graft copolymer by the process and in the amounts described in Example 11.

In Example 24, a precompatibilized mixture is obtained by blending mixed hardwood pulp of the type described in Example 11 (120 parts) and comminuted ethyl acrylate-rayon flock copolymer as obtained in Experiment 11 (48 parts) in a ball mill for 19 hours. In both examples, the precompatibilized cellulose is then blended with polyvinyl chloride in the manner and in the ratios described in Exampes 17 to 22. The flow of the final composite obtained in each example is determined and is reported in Table IV. Some of the physical properties of the composite are also determined and are reported in Table IV.

For purposes of comparison, controls are made for each of Examples 23 and 24. The control for Example 23 is prepared by swelling the mixed hardwood pulp in pyridine, precipitating the cellulose in water and washing and thereafter blending with compounded polyvinyl chloride as described above. The control for Example 24 is prepared by grinding the mixed hardwood pulp in a ball mill for 19 hours and thereafter blending with the polyvinyl chloride as described above. The ratio of cellulose to polyvinyl chloride in the controls is exactly the same as the ratio of cellulose to polyvinyl chloride in Examples 23 and 24, respectively. The flow and other physical properties of the controls are measured and are reported in Table IV.

As can be seen from Table IV, the composites containing the precompatibilized graft copolymer exhibit improved flow and improvements in other physical properties over the composites which do not contain any precompatibilized graft copolymer.

TABLE IV

| Example | 23 | Control for 23 | 24 | Control for 24 |
|---|---|---|---|---|
| Flow, cm.²/g. | 39.75 | 27.78 | 37.10 | 28.58 |
| Flow, improvement (percent better than control) | 43.1 | | 30.7 | |
| Tensile elongation, percent | 2 | 1 | 3 | 1 |
| Tensile yield strength, p.s.i. | | | 4,430 | |
| Flexural deflection, at max. load, in | 0.078 | 0.045 | 0.095 | 0.048 |

Other compatibilized and precompatibilized compositions may be prepared employing the procedures set forth in the preceding examples and in the more general description of this invention set forth hereinabove.

I claim:

1. A process for compatibilizing at least two normally incompatible polymers, at least one of the polymers being a highly hydrogen bonded polyhydric polymer and at least one other of said polymers being a thermoplastic polymer having a solubility parameter different than that of the polyhydric polymer, which comprises mixing said normally incompatible polymers with a graft copolymer under conditions of shear or in the presence of a solvent which decreases hydrogen bonding in the polyhydric polymer, said graft copolymer containing at least two segments, the corresponding polymers of said segments having different solubility parameters, one of said segments being of a highly hydrogen bonded polyhydric polymer and another of said segments being such that the midpoint of the solubility parameter range of the corresponding polymer differs from the midpoint of the solubility parameter range of said normally incompatible thermoplastic polymer which it is desired to compatibilize by no more than about one unit, the compatibilized composition being characterized by having improved processability and mechanical properties as compared to a mixture of said normally incompatible polymers in the absence of said graft copolymer.

2. A process as defined in claim 1 wherein said thermoplastic polymer is polyvinyl chloride.

3. A process as defined in claim 1 wherein said thermoplastic polymer is poly(methyl methacrylate).

4. A process as defined in claim 1 wherein said highly hydrogen bonded polyhydric polymer is a member selected from the group consisting of polysaccharides, polyvinyl alcohol and mixtures thereof.

5. A process as defined in claim 1 wherein said highly hydrogen bonded polyhydric polymer is cellulose.

6. A process as defined in claim 1 wherein said graft copolymer is composed of ethyl acrylate segments and segments of a highly hydrogen bonded polyhydric polymer selected from the group consisting of polysaccharides and polyvinyl alcohol.

7. A process as defined in claim 1 wherein said normally incompatible polymers and said graft copolymer are mechanically mixed under conditions of high shear.

8. A process as defined in claim 1 wherein said normally incompatible polymers and said graft copolymer are blended in the presence of a solvent which decreases hydrogen bonding in the polyhydric polymer and the compatibilized mixture is thereafter isolated from said solvent.

9. A process for preparing a precompatibilized composition containing a highly hydrogen bonded polyhydric polymer which is normally incompatible with most thermoplastic polymers, which process comprises mixing said highly hydrogen bonded polyhydric polymer with a graft copolymer under conditions of shear or in the presence of a solvent which decreases hydrogen bonding in the polyhydric polymer, said graft copolymer containing at least two segments, the corresponding polymers of said segments having different solubility parameters, one of said segments being of a highly hydrogen bonded polyhydric polymer, the precompatibilized composition being characterized by being compatible with a thermoplastic polymer which is normally incompatible with said polyhydric polymer and which has a solubility parameter range the midpoint of which differs from the midpoint of the solubility parameter of a polymer corresponding to one of the segments of said graft copolymer by no more than about one unit.

10. A process as defined in claim 9 wherein said highly hydrogen bonded polyhydric polymer is a member selected from the group consisting of polysaccharides, polyvinyl alcohol and mixtures thereof.

11. A process as defined in claim 9 wherein said highly hydrogen bonded polyhydric polymer is cellulose.

12. A process as defined in claim 9 wherein said graft copolymer is composed of ethyl acrylate segments and segments of a highly hydrogen bonded polyhydric polymer selected from the group consisting of polysaccharides and polyvinyl alcohol.

13. A process as defined in claim 9 wherein said highly hydrogen bonded polyhydric polymer and said graft copolymer are mechanically mixed under conditions of high shear.

14. A process as defined in claim 9 wherein said highly hydrogen bonded polyhydric polymer and said graft copolymer are blended in the presence of a solvent which decreases hydrogen bonding in the polyhydric polymer and the precompatibilized mixture is thereafter isolated from said solvent.

15. A precompatibilized composition obtained by the process of claim 9.

16. A composition obtained by the process of claim 1.
17. A composition obtained by the process of claim 2.
18. A composition obtained by the process of claim 3.
19. A composition obtained by the process of claim 4.
20. A composition obtained by the process of claim 5.
21. A composition obtained by the process of claim 6.
22. An article formed from the composition of claim 16.

References Cited

UNITED STATES PATENTS

| | | | |
|---|---|---|---|
| 2,922,768 | 1/1960 | Mino et al. | 260—17.4 |
| 3,037,948 | 6/1962 | Landler et al. | 260—4 |
| 3,046,078 | 7/1962 | Salsbury et al. | 8—116 |
| 3,065,041 | 11/1962 | Suen | 8—116 |

OTHER REFERENCES

Brockway, "Efficiency and Frequency of Grafting of Methyl Methacrylate to Granular Corn Starch," Journal of Polymer Science: Part A, vol. 2, pp. 3721–3723.

Brockway and Moser, J. Polymer Science, Part A, vol. I, pp. 1025–1039.

WILLIAM H. SHORT, Primary Examiner

E. NIELSEN, Assistant Examiner

U.S. Cl. X.R.

260—9, 857, 860, 876